United States Patent
Murakami et al.

(10) Patent No.: US 9,608,808 B2
(45) Date of Patent: Mar. 28, 2017

(54) MOBILE TERMINAL, CONTROL METHOD THEREOF, ONBOARD UNIT, CONTROL METHOD THEREOF, BACKEND SERVER, AND CONTROL METHOD THEREOF

(71) Applicant: Telefonaktiebolaget L M Ericsson (publ), Stockholm (SE)

(72) Inventors: Shingo Murakami, Kanagawa (JP); Takeshi Matsumura, Tokyo (JP); Toshikane Oda, Tokyo (JP); Shinta Sugimoto, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 14/775,334

(22) PCT Filed: Mar. 14, 2013

(86) PCT No.: PCT/SE2013/050239
§ 371 (c)(1),
(2) Date: Sep. 11, 2015

(87) PCT Pub. No.: WO2014/142719
PCT Pub. Date: Sep. 18, 2014

(65) Prior Publication Data
US 2016/0036586 A1 Feb. 4, 2016

(51) Int. Cl.
*H04K 1/00* (2006.01)
*H04L 9/08* (2006.01)
(Continued)

(52) U.S. Cl.
CPC .......... *H04L 9/0819* (2013.01); *G07B 15/063* (2013.01); *H04L 9/14* (2013.01);
(Continued)

(58) Field of Classification Search
CPC .............................. H04W 12/02; H04W 12/06
(Continued)

(56) References Cited

U.S. PATENT DOCUMENTS

| 8,215,546 B2 | 7/2012 | Lin et al. |
| 2012/0231815 A1 | 9/2012 | Güner |

(Continued)

FOREIGN PATENT DOCUMENTS

JP    2010244298 A    10/2010

OTHER PUBLICATIONS

Japanese Ministry of Land, Infrastructure, Transport and Tourism, "Deployment of 'ITS Sports'", Jan. 1, 2013, XP55087507, http://www.mlit.go.jp/road/ITS/topindex/ITSSpot.pdf (retrieved Nov. 11, 2013), 7 pages.

(Continued)

*Primary Examiner* — Anthony Brown
(74) *Attorney, Agent, or Firm* — Rothwell, Figg, Ernst & Manbeck, P.C.

(57) ABSTRACT

There is provided a mobile terminal for use in a system which includes a backend server having a first encryption key and an onboard unit (OBU). A first receiving unit receives, from the backend server, a base shared key encrypted with a second encryption key, the base shared key encrypted with the first encryption key, and a digital signature. A deriving unit decrypts the base shared key with the second encryption key and derives first authentication information based on the base shared key and a first temporary parameter. A second sending unit sends, to the OBU, the base shared key encrypted with the first encryption key, the digital signature, the first authentication information, identification information of the base shared key, and the first temporary parameter.

18 Claims, 8 Drawing Sheets

(51) Int. Cl.
    *G07B 15/06*     (2011.01)
    *H04W 12/06*    (2009.01)
    *H04L 29/08*     (2006.01)
    *H04W 12/04*    (2009.01)
    *H04L 9/14*       (2006.01)
    *H04W 84/00*    (2009.01)

(52) U.S. Cl.
    CPC ............ *H04L 67/12* (2013.01); *H04W 12/04* (2013.01); *H04W 12/06* (2013.01); *H04L 2209/24* (2013.01); *H04L 2209/80* (2013.01); *H04W 84/005* (2013.01)

(58) Field of Classification Search
    USPC ........................................................ 380/270
    See application file for complete search history.

(56) References Cited

U.S. PATENT DOCUMENTS

2012/0300929 A1    11/2012    Schrödl et al.
2013/0144811 A1*   6/2013     Padmalayam Narayana
                              Kurup ................ G06Q 30/0283
                                                          705/413

OTHER PUBLICATIONS

"3rd Generation Partnership Project; Technical Specification Group Services and System Aspects; Generic Authentication Architecture (GAA); Generic Bootstrapping Architecture (GBA) (Release 11)" 3GPP TS 33.220, V11.4.0, Sep. 2012, 92 pages.
International Search Report and Written Opinion issued in corresponding International Application No. PCT/SE/2013/050239 dated Nov. 25, 2013, 10 pages.

\* cited by examiner

MOBILE TERMINAL, CONTROL METHOD THEREOF, ONBOARD UNIT, CONTROL METHOD THEREOF, BACKEND SERVER, AND CONTROL METHOD THEREOF

CROSS REFERENCE TO RELATED APPLICATION(S)

This application is a 35 U.S.C. §371 National Phase Entry Application from PCT/SE2013/050239, filed Mar. 14, 2013, the disclosure of which is incorporated by reference.

TECHNICAL FIELD

The present invention generally relates to a technique for securely providing an onboard unit (OBU) with authentication information originating from a mobile communication system.

BACKGROUND

As the Intelligent Transportation System (ITS) technology evolves, more and more information about the traffic situations can be obtained and generated. ITS-dedicated wireless network systems have been developed to support Vehicle-to-Roadside (V2R) communications. For example, in Japan, the ITS spot and Electric Toll Collection (ETC) gate infrastructure based on the Dedicated Short-Range Communication (DSRC) standard using 5.8 GHz band has been deployed nationwide on the highways [1], and the V2R communications for obtaining the information from cars and delivering traffic information to the cars are supported by using the DSRC-enabled onboard unit (OBU) loaded on the cars.

Also, a mobile communication system is broadly deployed, and it is proposed to execute transportation check-in (e.g., ticketing and identification) using a cellular phone [2].

Currently, the DSRC-based V2R communication system and the mobile communication system are isolated and little studies have been made to explore the effective combination of the two communication systems to create new values in terms of enhanced services delivered to the users.

SUMMARY

The inventor conceived that new services can be realized if a short-range communication-based system and a mobile communication system are combined in a manner that a user of a mobile terminal can be identified based on the communication between an onboard unit (OBU) and an ITS spot. For example, a highway toll fare may be charged to an account of the mobile terminal in place of an account of an IC card inserted into the OBU. As another example, communication between the OBU and the ITS spot may trigger a delivery of various information such as coupons and traffic information to the mobile terminal.

The present invention has been made in view of the above circumstances, and it is an object thereof to provide a technique for securely providing an onboard unit (OBU) with authentication information originating from a mobile communication system.

According to the first aspect of the present invention, there is provided a mobile terminal for use in a system which includes a backend server having a first encryption key and an onboard unit (OBU) capable of verifying a digital signature made by the backend server and decrypting information encrypted with the first encryption key. The mobile terminal comprises a first sending unit configured to send, to the backend server, an identity of the OBU and identification information of a second encryption key shared between the mobile terminal and the backend server. The mobile terminal also comprises a first receiving unit configured to receive, from the backend server, a base shared key encrypted with the second encryption key, the base shared key encrypted with the first encryption key, and a digital signature made by the backend server for demonstrating authenticity of the base shared key. The mobile terminal further comprises a deriving unit configured to decrypt the base shared key with the second encryption key and derive first authentication information based on the base shared key and a first temporary parameter. In addition, the mobile terminal comprises a second sending unit configured to send, to the OBU, the base shared key encrypted with the first encryption key, the digital signature, the first authentication information, identification information of the base shared key, and the first temporary parameter.

According to the second aspect of the present invention, there is provided an onboard unit (OBU) for use in a system which includes a mobile terminal and a backend server having a first encryption key. The OBU comprises a receiving unit configured to receive, from the mobile terminal, a base shared key encrypted with a first encryption key, a digital signature made by the backend server for demonstrating authenticity of the base shared key, a first authentication information derived based on the base shared key and a first temporary parameter, identification information of the base shared key, and the first temporary parameter. The OBU also comprises a decrypting unit configured to decrypt the base shared key with a decryption key corresponding to the first encryption key and a verifying unit configured to verify the digital signature and verify the first authentication information based on the base shared key and the first temporary parameter. The OBU further comprises a storing unit configured to store the first authentication information, the identification information of the base shared key, and the first temporary parameter if the digital signature and the first authentication information are verified successfully. In addition, the OBU comprises a first sending unit configured to send, to a short-range communication station configured to communicate with the backend server, the first authentication information, the identification information of the base shared key, and the first temporary parameter when the OBU enters a communication range of the short-range communication station.

According to the third aspect of the present invention, there is provided a backend server for use in a system which includes a mobile terminal and an onboard unit (OBU) capable of verifying a digital signature made by the backend server and decrypting information encrypted with a first encryption key. The backend server comprises a first receiving unit configured to receive, from the mobile terminal, an identity of the OBU and identification information of a second encryption key shared between the mobile terminal and the backend server. The backend server also comprises a generating unit configured to generate a base shared key encrypted with the second encryption key, the base shared key encrypted with the first shred key corresponding to the identity of the OBU, and a digital signature for demonstrating authenticity of the base shared key. The backend server further comprises a sending unit configured to send, to the mobile terminal, the base shared key encrypted with the second encryption key, the first shred key encrypted with the first shred key, and the digital signature. In addition, the backend server comprises a second receiving unit configured to receive, from a short-range communication station, a first temporary parameter, first authentication information derived based on the base shared key and the first temporary parameter, and identification information of the base shared key. Moreover, the backend server comprises a verifying unit configured to verify the first authentication information based on the first temporary parameter and the base shared key.

According to the fourth aspect of the present invention, there is provided a method for controlling a mobile terminal for use in a system which includes a backend server having a first encryption key and an onboard unit (OBU) capable of verifying a digital signature made by the backend server and decrypting information encrypted with the first encryption key. The method comprises a first sending step of sending, to the backend server, an identity of the OBU and identification information of a second encryption key shared between the mobile terminal and the backend server. The method also comprises a first receiving step of receiving, from the backend server, a base shared key encrypted with the second encryption key, the base shared key encrypted with the first encryption key, and a digital signature made by the backend server for demonstrating authenticity of the base shared key. The method further comprises a deriving step of decrypting the base shared key with the second encryption key and deriving first authentication information based on the base shared key and a first temporary parameter. In addition, the method comprises a second sending step of sending, to the OBU, the base shared key encrypted with the first encryption key, the digital signature, the first authentication information, identification information of the base shared key, and the first temporary parameter.

According to the fifth aspect of the present invention, there is provided a method for controlling an onboard unit (OBU) for use in a system which includes a mobile terminal and a backend server having a first encryption key. The method comprises a receiving step of receiving, from the mobile terminal, a base shared key encrypted with a first encryption key, a digital signature made by the backend server for demonstrating authenticity of the base shared key, a first authentication information derived based on the base shared key and a first temporary parameter, identification information of the base shared key, and the first temporary parameter. The method also comprises a decrypting step of decrypting the base shared key with a decryption key corresponding to the first encryption key and a verifying step of verifying the digital signature and verifying the first authentication information based on the base shared key and the first temporary parameter. The method further comprises a storing step of storing the first authentication information, the identification information of the base shared key, and the first temporary parameter if the digital signature and the first authentication information are verified successfully. In addition, the method comprises a first sending step of sending, to a short-range communication station configured to communicate with the backend server, the first authentication information, the identification information of the base shared key, and the first temporary parameter when the OBU enters a communication range of the short-range communication station.

According to the sixth aspect of the present invention, there is provided a method for controlling a backend server for use in a system which includes a mobile terminal and an onboard unit (OBU) capable of verifying a digital signature made by the backend server and decrypting information encrypted with a first encryption key. The method comprises a first receiving step of receiving, from the mobile terminal, an identity of the OBU and identification information of a second encryption key shared between the mobile terminal and the backend server. The method also comprises a generating step of generating a base shared key encrypted with the second encryption key, the base shared key encrypted with the first shred key corresponding to the identity of the OBU, and a digital signature for demonstrating authenticity of the base shared key. The method further comprises a sending step of sending, to the mobile terminal, the base shared key encrypted with the second encryption key, the first shred key encrypted with the first shred key, and the digital signature. In addition, the method comprises a second receiving step of receiving, from a short-range communication station, a first temporary parameter, first authentication information derived based on the base shared key and the first temporary parameter, and identification information of the base shared key. Moreover, the method comprises a verifying step of verifying the first authentication information based on the first temporary parameter and the base shared key.

By virtue of the above features, it is possible to securely provide an onboard unit (OBU) with authentication information originating from a mobile communication system.

Further features and advantages of the present invention will be apparent from the following description with reference to the accompanying drawings, in which like reference characters designate the same or similar parts throughout the figures thereof.

DETAILED DESCRIPTION

Embodiments of the present invention will be described in the context of the ITS system deployed in Japan [1] and the mobile communication system defined by the 3rd Generation Partnership Project (3GPP) [3]. However, the present invention is not limited to these systems, and can be applied to any other short-range communication-based systems and mobile communication systems.

First Embodiment

Figure 1:
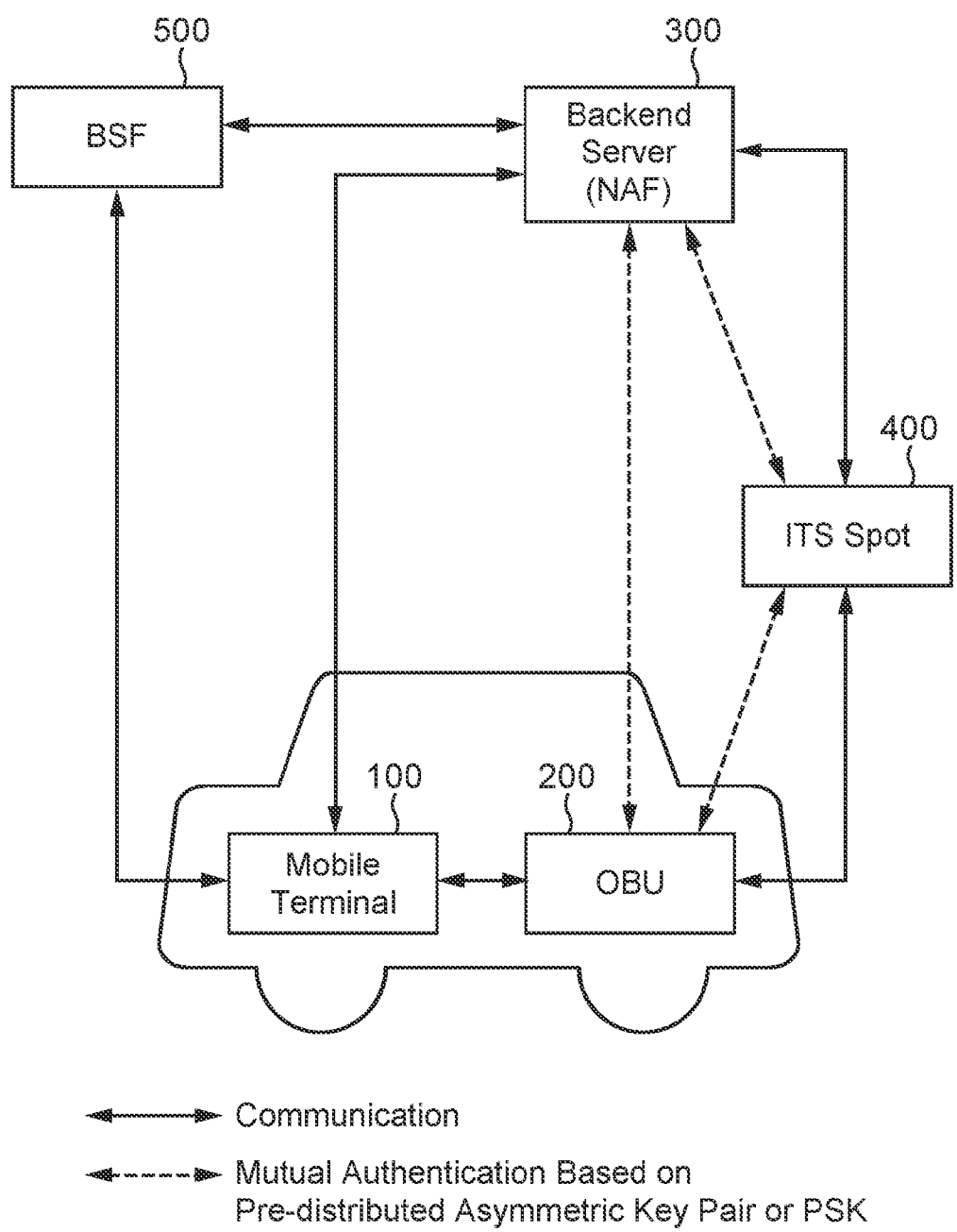
FIG. 1 illustrates an overview of the combination of an ITS system and a mobile communication system according to the first embodiment of the present invention.

FIG. 1 illustrates an overview of the combination of an ITS system and a mobile communication system according to the first embodiment of the present invention. In FIG. 1, a mobile terminal 100 and an onboard unit (OBU) 200 are loaded on a car. A backend server 300 functions as a backend system for an ITS spot 400. The ITS spot 400 is implemented by any suitable short-range communication station. The backend server 300 also functions as a Generic Bootstrapping Architecture (GBA) Network Application Function (NAF) defined by 3GPP TS 33.220, and communicates with a Bootstrapping Server Function (BSF) 500.

In the ITS system of FIG. 1, the mutual trust relationship exists between the OBU 200, the backend server 300, and the ITS spot 400. This relationship is realized by pre-distributed keys (which may be either an asymmetric key pair or a pre-shared key) distributed from a security authority organization (e.g., Organization for Road System Enhancement [4]) to every OBU, backend server, and ITS spot. The keys are securely stored in a tamper-resistance security module of the OBUs and ITS spots. The OBUs, ITS spots, and backend servers can be authenticated to each other by using these keys.

When the OBU 200 passes by the ITS spot 400 (i.e., enters the communication range of the ITS spot 400), various information such as an identity of the OBU 200 is sent from the OBU 200 to the backend server 300 through the ITS spot 400. In order for the backend server 300 to provide any services (e.g., charging for a toll fare or delivery of coupons) to the mobile terminal 100 in response to the reception of the information from the OBU 200, it is necessary for the backend server 300 to identify the mobile terminal 100 based on this information. In other words, the information sent from the OBU 200 must contain authentication information for identifying the mobile terminal 100. Therefore, it is necessary to provide the OBU 200 with the authentication information in advance.

However, under the conventional art, there is no mechanism by which the OBU 200 can authenticate the mobile terminal 100. Accordingly, it was not possible to securely provide the OBU 200 with the authentication information. Without security, for example, a malicious user may provide the OBU 200 with authentication information of another user to avoid the payment of a toll fare. Even if the backend server 300 can somehow detect the misuse of the authentication information later, due to the delay from the communication between the OBU 200 and the ITS spot 400, the car loading the OBU 200 would have already passed a toll gate when the backend server 300 detected the misuse.

In contrast, the present embodiment introduces a mechanism for securely providing the OBU 200 with the authentication information. In the present embodiment, the security is realized by a base shared key which is shared between the mobile terminal 100, the OBU 200, and the backend server 300. The base shared key is generated by the backend server 300 and delivered to the mobile terminal 100 and the OBU 200. The delivery is secured by the mutual authentication between the mobile terminal 100 and the backend server 300 based on the GBA and the mutual authentication between the OBU 200 and the backend server 300 based on the pre-distributed keys.

Figure 2:
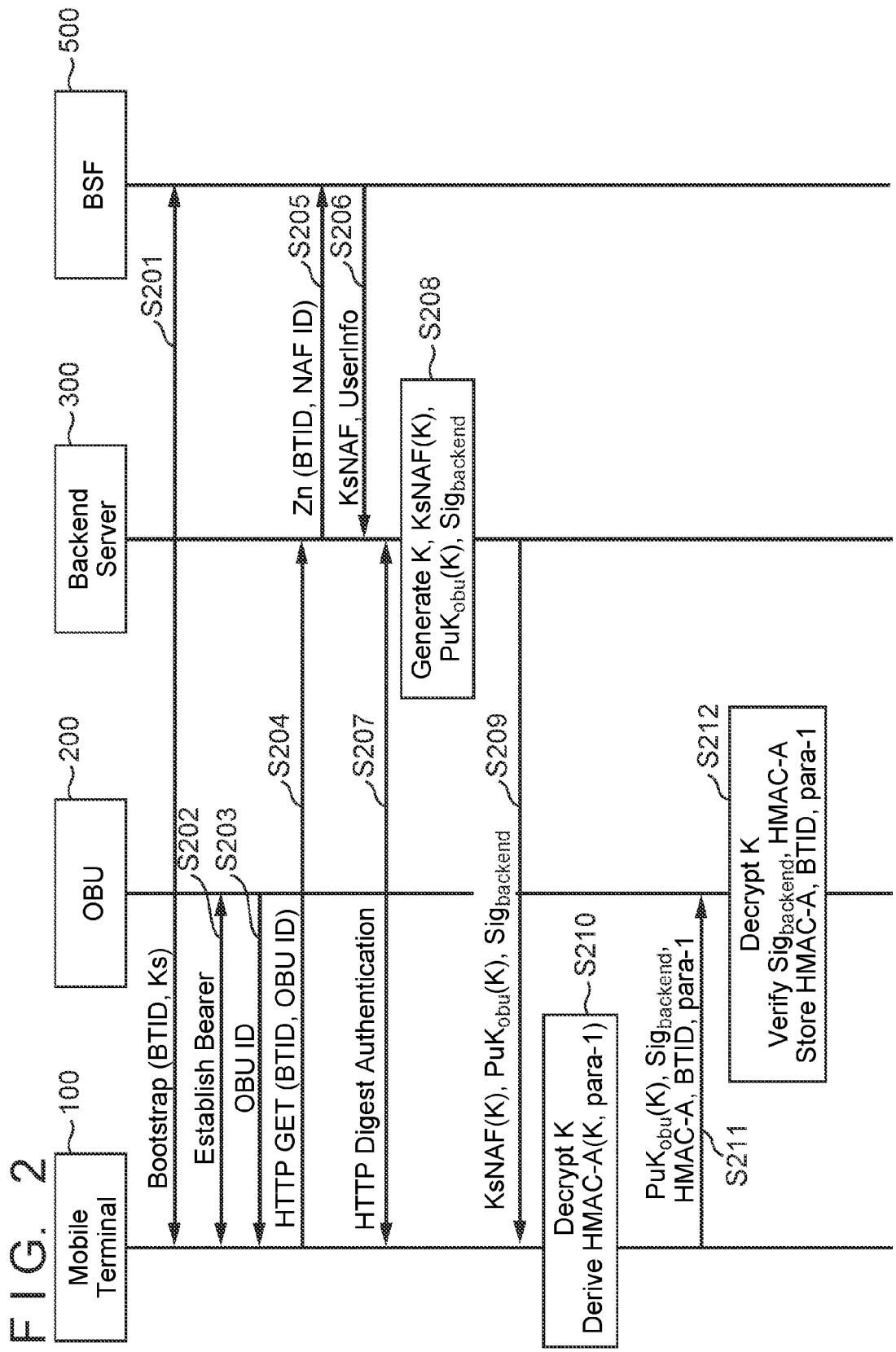
FIG. 2 is a sequence diagram illustrating a procedure of providing authentication information according to the first embodiment of the present invention.

FIG. 2 is a sequence diagram illustrating a procedure of providing authentication information according to the first embodiment of the present invention.

In step S201, the mobile terminal 100 performs the GBA bootstrap and establishes a bootstrapping transaction identifier (BTID) and a key Ks which are shared with the BSF 500.

In step S202, a user boards a car and operates the mobile terminal 100 to establish a bearer (e.g., Bluetooth, WiFi, etc.) with the OBU 200.

In step S203, the OBU 200 sends its identity (OBU ID) to the mobile terminal 100.

In step S204, the mobile terminal 100 starts an HTTP communication and sends the BTID and the OBU ID to the backend server 300.

In steps S205-S206, the backend server 300 obtains the KsNAF (second encryption key) and user information of the mobile terminal 100 by sending the BTID and the NAF ID to the BSF 500. In these steps, the BTID works as identification information of the KsNAF shared between the mobile terminal 100 and the backend server 300.

In step S207, the mobile terminal 100 performs mutual HTTP Digest Authentication based on the standard GBA toward the backend server 300.

In step S208, if the mobile terminal 100 is authenticated in step S207, the backend server 300 generates a base shared key K and identification information of the key K. Alternatively, the backend server 300 may use the BTID as the identification information of the key K instead of generating it. FIG. 2 shows the latter case. Then, the backend server 300 encrypts the key K with the KsNAF. The key K encrypted with KsNAF is referred to as KsNAF(K). Moreover, the backend server 300 identifies a public key of the OBU 200 ($PuK_{obu}$) (first encryption key) based on the OBU ID received in step S204, and encrypts the key K with the identified public key. The key K encrypted with the public key of the OBU 200 is referred to as $PuK_{obu}(K)$. Furthermore, the backend server 300 generates a digital signature ($Sig_{backend}$) for demonstrating authenticity of the key K by using a private key of the backend server 300.

In step S209, the backend server 300 sends the KsNAF (K), the $PuK_{obu}(K)$, the $Sig_{backend}$, and the identification information of the key K to the mobile terminal 100. Alternatively, in the case that the backend server 300 uses the BTID as the identification information of the key K, the backend server 300 can omit sending the identification information of the key K to the mobile terminal 100.

In step S210, the mobile terminal 100 decrypts the key K with the KsNAF, and derives the first hash-based message authentication code (HMAC-A), which is also referred to as the first authentication information, based on the key K and a first temporary parameter (para-1) such as a random number or a time.

In step S211, the mobile terminal 100 sends the $PuK_{obu}$ (K), the $Sig_{backend}$, the HMAC-A, and the para-1 to the OBU 200. The mobile terminal 100 also sends the identification information of the key K, which was received in step S209, to the OBU 200. Alternatively, in the case that the backend server 300 uses the BTID as the identification information of the key K, the mobile terminal sends the BTID established in step S201 to the OBU 200.

In step S212, the OBU 200 decrypts the key K with the private key of the OBU 200, and verifies the $Sig_{backend}$ based on the public key of the backend server 300. The success verification of the $Sig_{backend}$ means that the key K was actually generated by the backend server 300. In other words, if the received key K was generated by a malicious user, the OBU 200 can detect this fact because the verification of the $Sig_{backend}$ fails. Then, the OBU 200 verifies the I-MAC-A based on the decrypted key K and the received para-1. The success verification of the HMAC-A means that the mobile terminal 100 which provided the OBU 200 with the HMAC-A was actually authenticated by the backend server 300. In other words, even if a malicious user steals the $PuK_{obu}(K)$ and the $Sig_{backend}$ by intercepting the communication made in step S209 or S211, the malicious user cannot generate a correct HMAC-A because the malicious user does not have the key K. If the $Sig_{backend}$ and the HMAC-A are verified successfully, the OBU 200 stores the HMAC-A, the BTID (or the identification information of the key K), and the para-1.

As a result of the above procedure, the OBU 200 is securely provided with the HMAC-A. Because the HMAC-A originates from the mobile communication system (i.e., the HMAC-A is derived based on the key K generated by the backend server 300), the backend server 300 which receives the HMAC-A from the OBU 200 through the ITS Spot 400 later can identify the mobile terminal 100 which should be served by the backend server 300, as detailed with reference to FIG. 3.

The mobile terminal 100 and the OBU 200 discard all credentials such as the HMAC-A, the key K, and the KsNAF when the bearer established between the mobile terminal 100 and the OBU 200 is disconnected (e.g., when the engine stops, the user leaves the car, etc.)

Depending on a bearer technology used between the mobile terminal 100 and the OBU 200, multiple mobile terminals may be paired with the OBU 200 at the same time. In this case, several options can be considered.

- Select one mobile terminal per service via the user interface of the OBU 200. For example, father's mobile terminal may be selected for a road charging while mother's mobile terminal may be selected for coupon delivery services.
- Road charging may be divided into all the paired mobile terminals.
- A group key is delivered to all the mobile terminals associated with a single OBU ID; a group key proves that owners of the group key are passengers of the same car. The group key may be used for discount services, ticketing, etc.

Figure 3:
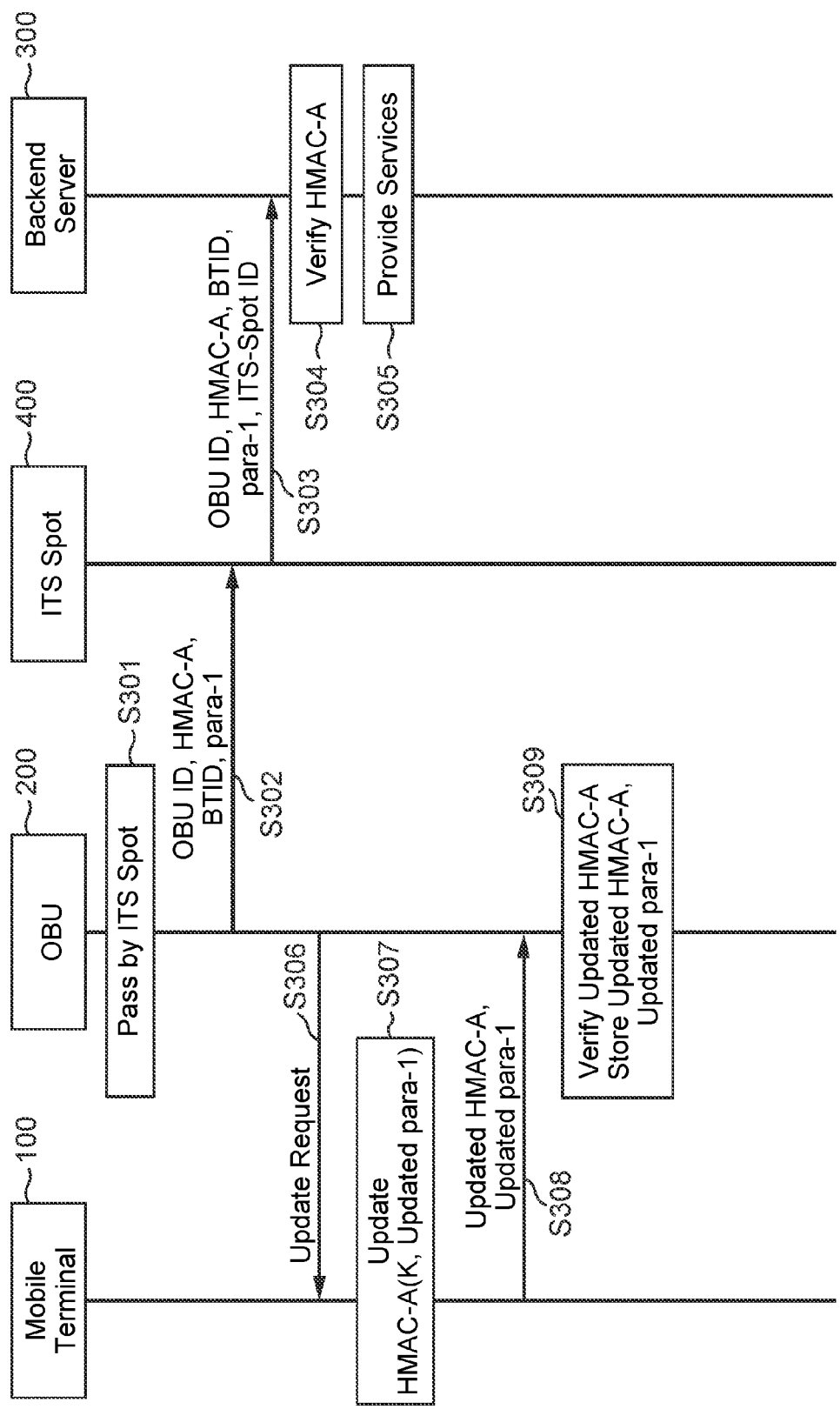
FIG. 3 is a sequence diagram illustrating a procedure of serving the mobile terminal 100 when the onboard unit (OBU) 200 passes by the ITS spot 400 according to the first embodiment of the present invention.

FIG. 3 is a sequence diagram illustrating a procedure of serving the mobile terminal 100 when the OBU 200 passes by the ITS spot 400 according to the first embodiment of the present invention.

In step S301, the car loading the OBU 200 passes by the ITS spot 400 (i.e., the OBU 200 enters the communication range of the ITS spot 400).

In step S302, the OBU 200 sends, via the DSRC-based communication, the OBU ID, the HMAC-A, the BTID (or the identification information of the key K), and the para-1 to the ITS spot 400.

In step S303, the ITS spot 400 forwards the OBU ID, the HMAC-A, the BTID (or the identification information of the key K), and the para-1 to the backend server 300. Moreover, the ITS spot 400 sends its identity (ITS-Spot ID) to the backend server 300.

In step S304, the backend server 300 verifies the HMAC-A based on the key K, which is identified by the BTID, and the para-1.

In step S305, if the HMAC-A was verified successfully in step S304, the backend server 300 provides the mobile terminal 100 with any pertinent services. For example, if the ITS-Spot ID indicates that the ITS spot 400 is installed at a highway toll gate, the backend server 300 charges a toll fare to an account of the mobile terminal 100.

In step S306, the OBU 200 requests the mobile terminal 100 to update the HMAC-A.

In step S307, the mobile terminal 100 updates the HMAC-A by calculating the HMAC based on the key K and the updated first temporary parameter (para-1). For example, if the para-1 is a random number, the mobile terminal 100 uses a random number that is different from the random number used in step S210.

In step S308, the mobile terminal 100 sends the updated HMAC-A and the updated para-1 to the OBU 200.

In step S309, the OBU 200 verifies the updated HMAC-A based on the key K and the updated para-1. If the updated HMAC-A is verified successfully, the OBU 200 replaces the stored HMAC-A and the para-1 with the updated HMAC-A and the updated para-1.

Steps S302-S309 are repeated every time the OBU 200 passes by the ITS spot 400. In other words, the HMAC-A is updated every time the OBU 200 passes by the ITS spot 400. Therefore, a potential replay attack for the HMAC-A can be avoided. If the backend server 300 detects that the same HMAC-A for the same BTID and OBU ID is used twice, it may throw a security alert.

Figure 4:
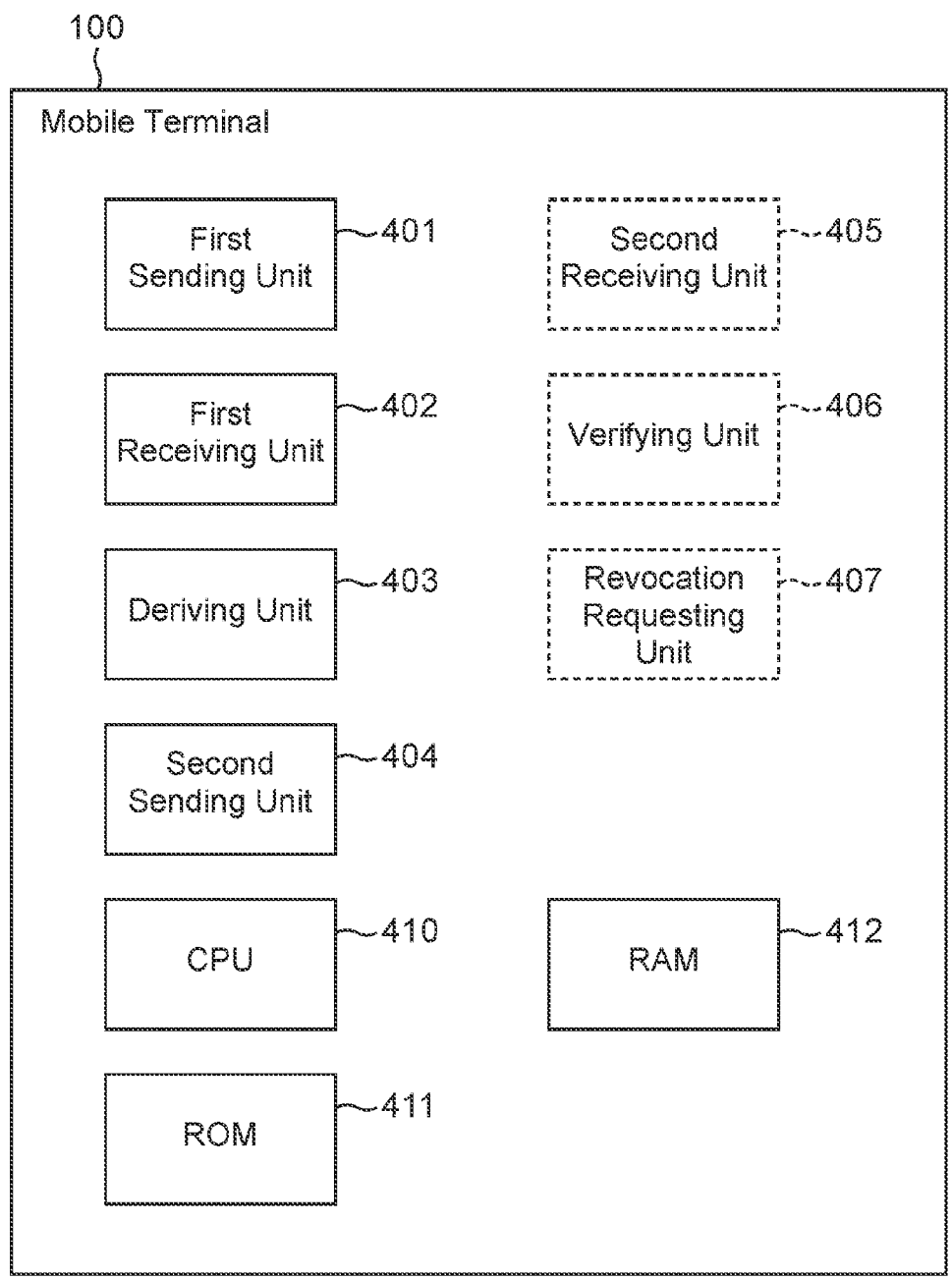
FIG. 4 is a functional block diagram of the mobile terminal 100 according to the first and second embodiments of the present invention.

FIG. 4 is a functional block diagram of the mobile terminal 100 according to the first embodiment of the present invention. In FIG. 4, the units in the boxes with dashed lines are only for the second embodiment. Therefore, these units will be described later in the second embodiment.

The mobile terminal 100 comprises a first sending unit 401, a first receiving unit 402, a deriving unit 403, and a second sending unit 404.

The first sending unit 401 is configured to send, to the backend server 300, an identity of the OBU 200 and identification information of a second encryption key shared between the mobile terminal 100 and the backend server 300. The first receiving unit 402 is configured to receive, from the backend server 300, a base shared key encrypted with the second encryption key, the base shared key encrypted with the first encryption key, and a digital signature made by the backend server 300 for demonstrating authenticity of the base shared key. The deriving unit 403 is configured to decrypt the base shared key with the second encryption key and derive first authentication information based on the base shared key and a first temporary parameter. The second sending unit 404 is configured to send, to the OBU 200, the base shared key encrypted with the first encryption key, the digital signature, the first authentication information, identification information of the base shared key, and the first temporary parameter.

The mobile terminal 100 also comprises a central processing unit (CPU) 410, a read only memory (ROM) 411, and a random access memory (RAM) 412. The functionality of the respective units of the mobile terminal 100 may be implemented by the CPU 410 which executes software stored in the ROM 411 with using the RAM 412 as a work area. Alternatively, the functionality of some or all of the respective units may be implemented using dedicated hardware, or by the combination of software and hardware.

Figure 5:
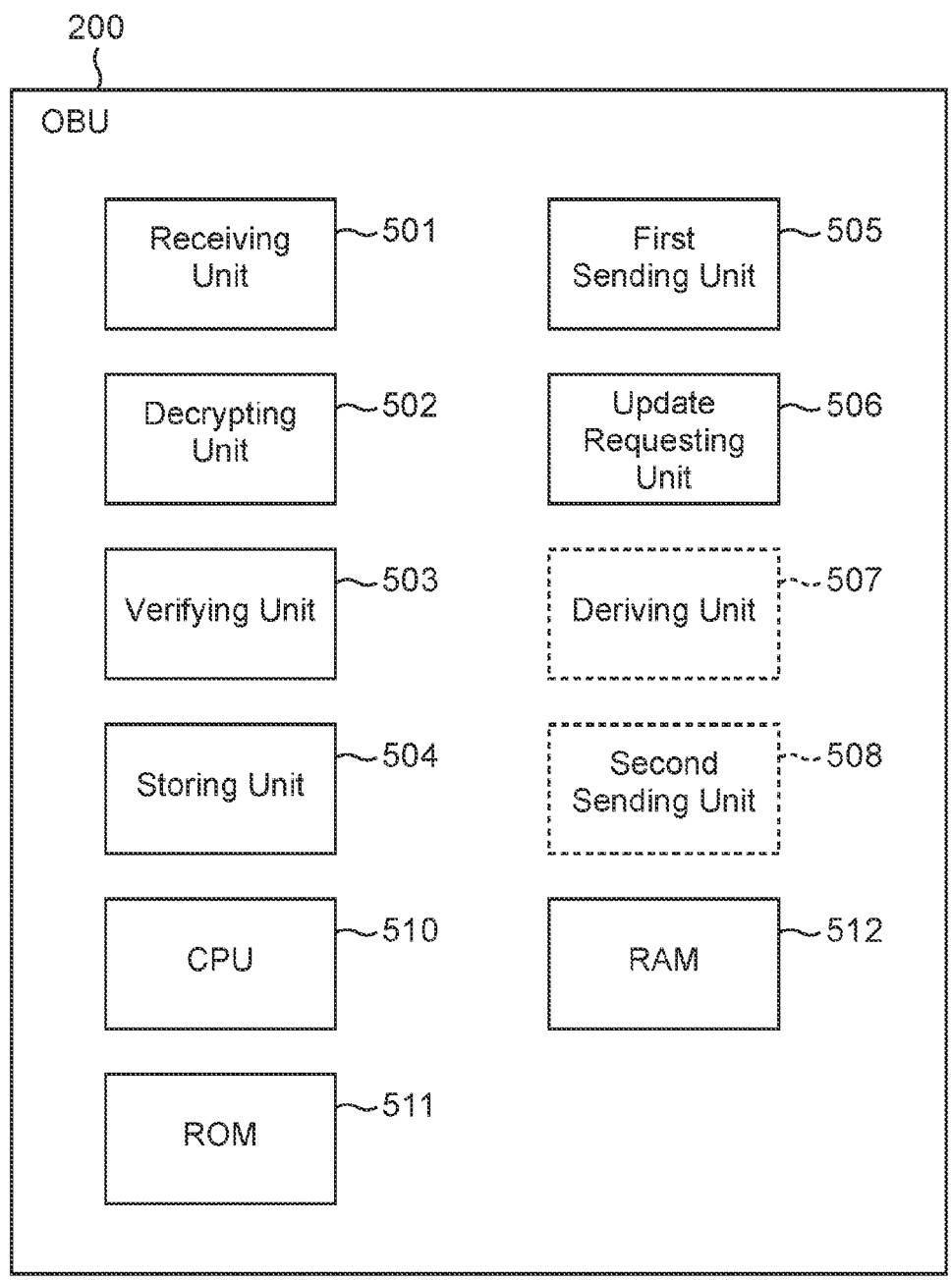
FIG. 5 is a functional block diagram of the OBU 200 according to the first and second embodiments of the present invention.

FIG. 5 is a functional block diagram of the OBU 200 according to the first embodiment of the present invention. In FIG. 5, the units in the boxes with dashed lines are only for the second embodiment. Therefore, these units will be described later in the second embodiment.

The OBU 200 comprises a receiving unit 501, a decrypting unit 502, a verifying unit 503, a storing unit 504, a first sending unit 505, and an update requesting unit 506.

The receiving unit 501 is configured to receive, from the mobile terminal 100, a base shared key encrypted with a first encryption key, a digital signature made by the backend server 300 for demonstrating authenticity of the base shared key, a first authentication information derived based on the base shared key and a first temporary parameter, identification information of the base shared key, and the first temporary parameter. The decrypting unit 502 is configured to decrypt the base shared key with a decryption key corresponding to the first encryption key. The verifying unit 503 is configured to verify the digital signature and verify the first authentication information based on the base shared key and the first temporary parameter. The storing unit 504 is configured to store the first authentication information, the identification information of the base shared key, and the first temporary parameter if the digital signature and the first authentication information are verified successfully. The first sending unit 505 is configured to send, to a short-range communication station configured to communicate with the backend server 300, the first authentication information, the identification information of the base shared key, and the first temporary parameter when the OBU 200 enters a communication range of the short-range communication station. The update requesting unit 506 is configured to request the mobile terminal to update the first authentication information.

The OBU 200 also comprises a central processing unit (CPU) 510, a read only memory (ROM) 511, and a random access memory (RAM) 512. The functionality of the respective units of the OBU 200 may be implemented by the CPU 510 which executes software stored in the ROM 511 with using the RAM 512 as a work area. Alternatively, the functionality of some or all of the respective units may be implemented using dedicated hardware, or by the combination of software and hardware.

Figure 6:
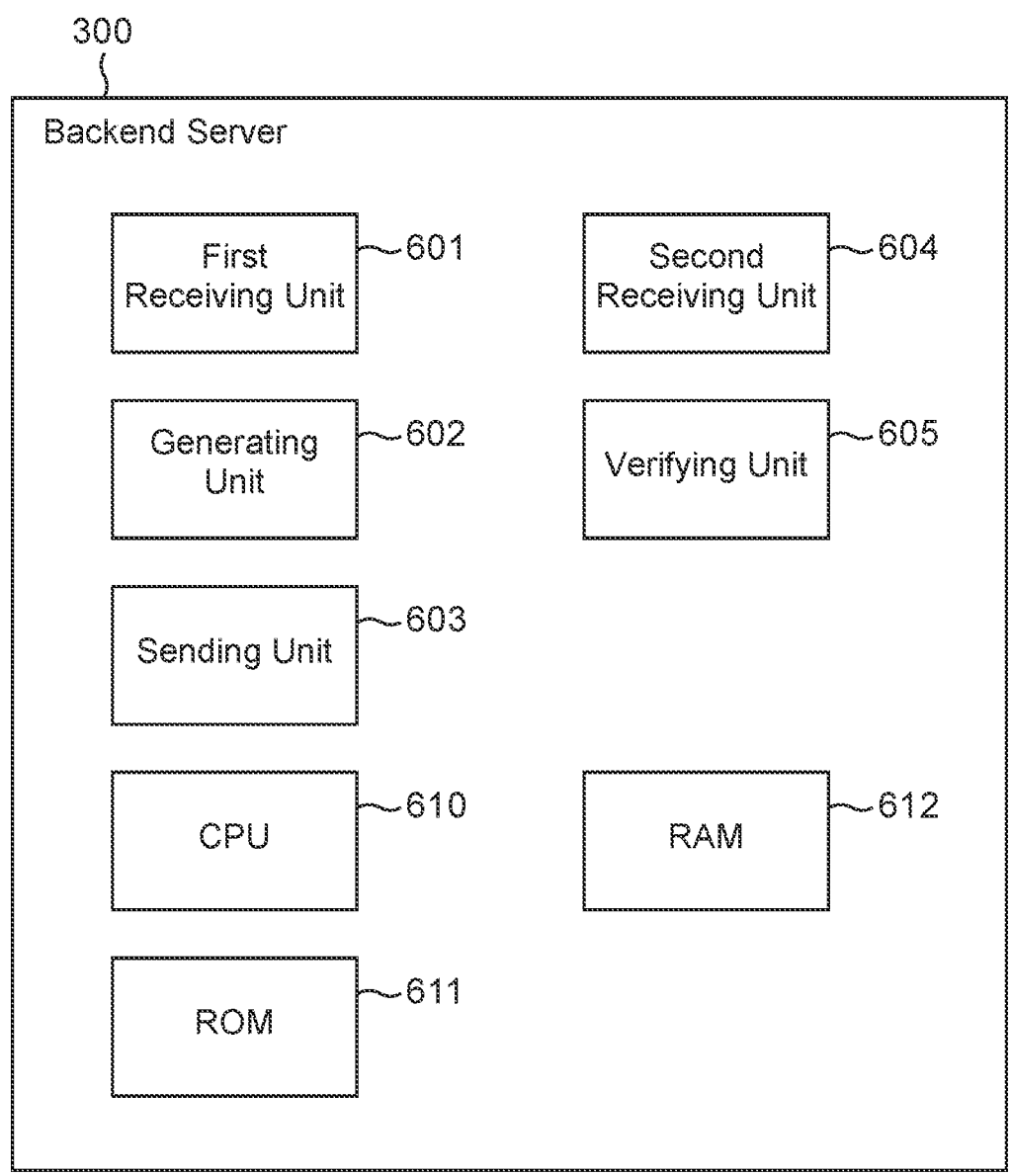
FIG. 6 is a functional block diagram of the backend server 300 according to the first and second embodiments of the present invention.

FIG. 6 is a functional block diagram of the backend server 300 according to the first embodiment of the present invention.

The backend server 300 comprises a first receiving unit 601, a generating unit 602, a sending unit 603, a second receiving unit 604, and a verifying unit 605.

The first receiving unit 601 is configured to receive, from the mobile terminal 100, an identity of the OBU 200 and identification information of a second encryption key shared between the mobile terminal and the backend server. The generating unit 602 is configured to generate a base shared key encrypted with the second encryption key, the base shared key encrypted with the first shred key corresponding to the identity of the OBU 200, and a digital signature for demonstrating authenticity of the base shared key. The sending unit 603 is configured to send, to the mobile terminal, the base shared key encrypted with the second encryption key, the first shred key encrypted with the first shred key, and the digital signature. The second receiving unit 604 is configured to receive, from a short-range communication station, a first temporary parameter, first authentication information derived based on the base shared key and the first temporary parameter, and identification information of the base shared key. The verifying unit 605 is configured to verify the first authentication information based on the first temporary parameter and the base shared key.

The backend server 300 also comprises a central processing unit (CPU) 610, a read only memory (ROM) 611, and a random access memory (RAM) 612. The functionality of the respective units of the backend server 300 may be implemented by the CPU 610 which executes software stored in the ROM 611 with using the RAM 612 as a work area. Alternatively, the functionality of some or all of the respective units may be implemented using dedicated hardware, or by the combination of software and hardware.

As described above, according to the present embodiment, it is possible to securely provide the OBU 200 with the HMAC-A originating from the mobile communication system.

Second Embodiment

In the second embodiment, a mechanism for further enhancing security will be described. The differences from the first embodiment will be described with reference to FIGS. 7 and 8.

Figure 7:
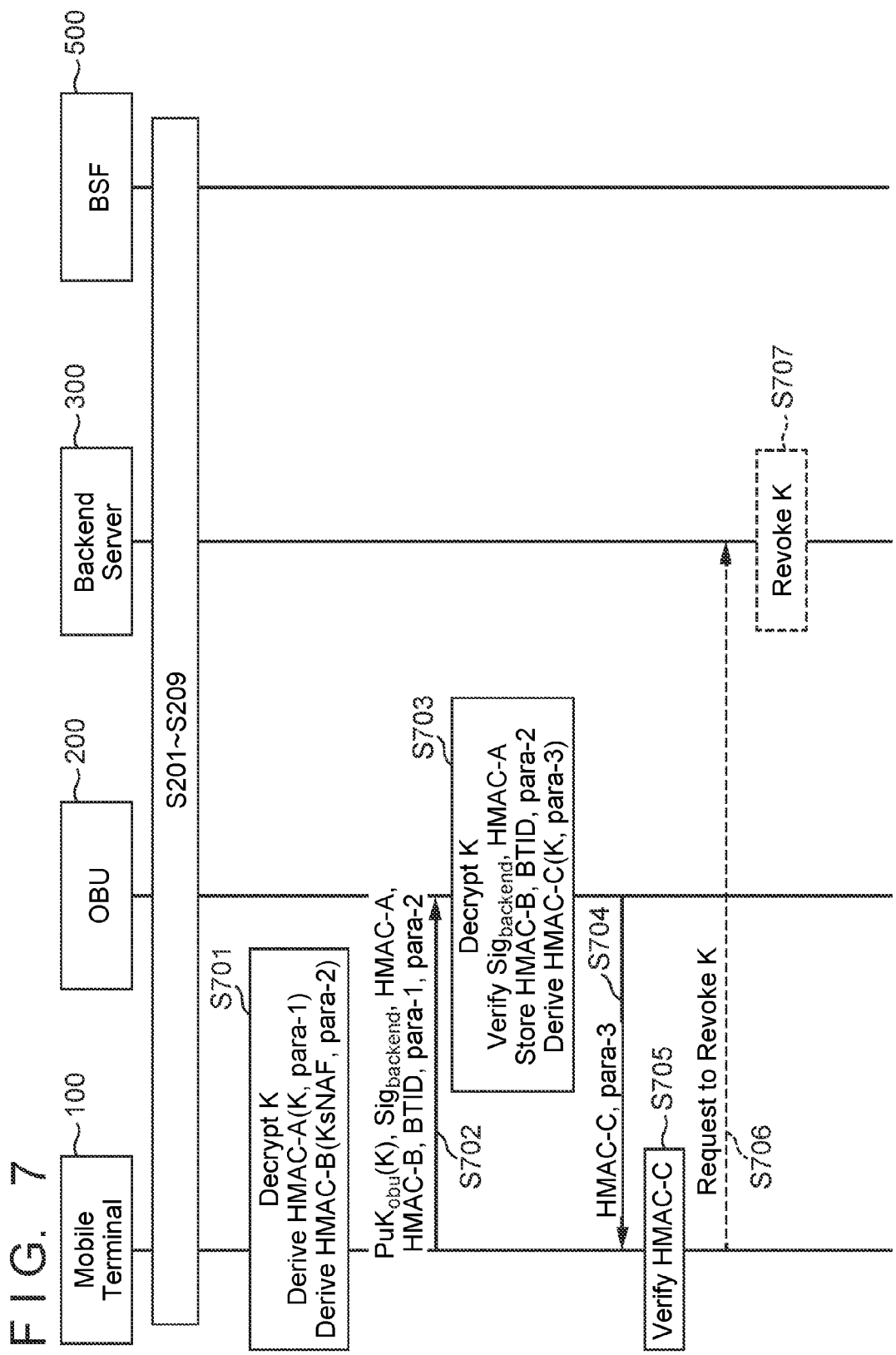
FIG. 7 is a sequence diagram illustrating a procedure of providing authentication information according to the second embodiment of the present invention.

FIG. 7 is a sequence diagram illustrating a procedure of providing authentication information according to the second embodiment of the present invention. In FIG. 7, the processing that is the same or similar to FIG. 2 is executed in steps S201-S209; therefore, description of these steps is omitted.

In step S701, the mobile terminal 100 decrypts the key K and derives the HMAC-A as described with reference to step S210 of FIG. 2. In addition, the mobile terminal 100 derives the second hash-based message authentication code (HMAC-B), which is also referred to as the second authentication information, based on the KsNAF and a second temporary parameter (para-2) such as a random number or a time.

In step S702, the mobile terminal 100 sends the $PuK_{obu}$ (K), the $Sig_{backend}$, the HMAC-A, the HMAC-B, the para-1, and the para-2 to the OBU 200. The mobile terminal 100 also sends the BTID as the identification information of the KsNAF to the OBU 200. In addition, the mobile terminal 100 may or may not send the identification information of the key K to the OBU 200.

In step S703, the OBU 200 decrypts the key K and verifies the $Sig_{backend}$ and the HMAC-A as described with reference to step S212 of FIG. 2. If the $Sig_{backend}$ and the HMAC-A are verified successfully, the OBU 200 stores the HMAC-B, the BTID as the identification information of the KsNAF, and the para-2. In addition, the OBU 200 may or may not store the HMAC-A, the identification information of the key K, and the para-1. Then, the OBU 200 derives the third hash-based message authentication code (HMAC-C), which is also referred to as the third authentication information, based on the key K and a third temporary parameter (para-3) such as a random number or a time.

In step S704, the OBU 200 sends the HMAC-C and the para-3 to the mobile terminal 100.

In step S705, the mobile terminal 100 verifies the HMAC-C based on the key K and the para-3. The success verification of the HMAC-C means that the OBU 200 is actually authenticated by the backend server 300.

In step S706, if the verification of the HMAC-C fails in step S705, the mobile terminal 100 requests the backend server 300 to revoke the key K.

In step S707, the backend server 300 revokes the key K.

Figure 8:
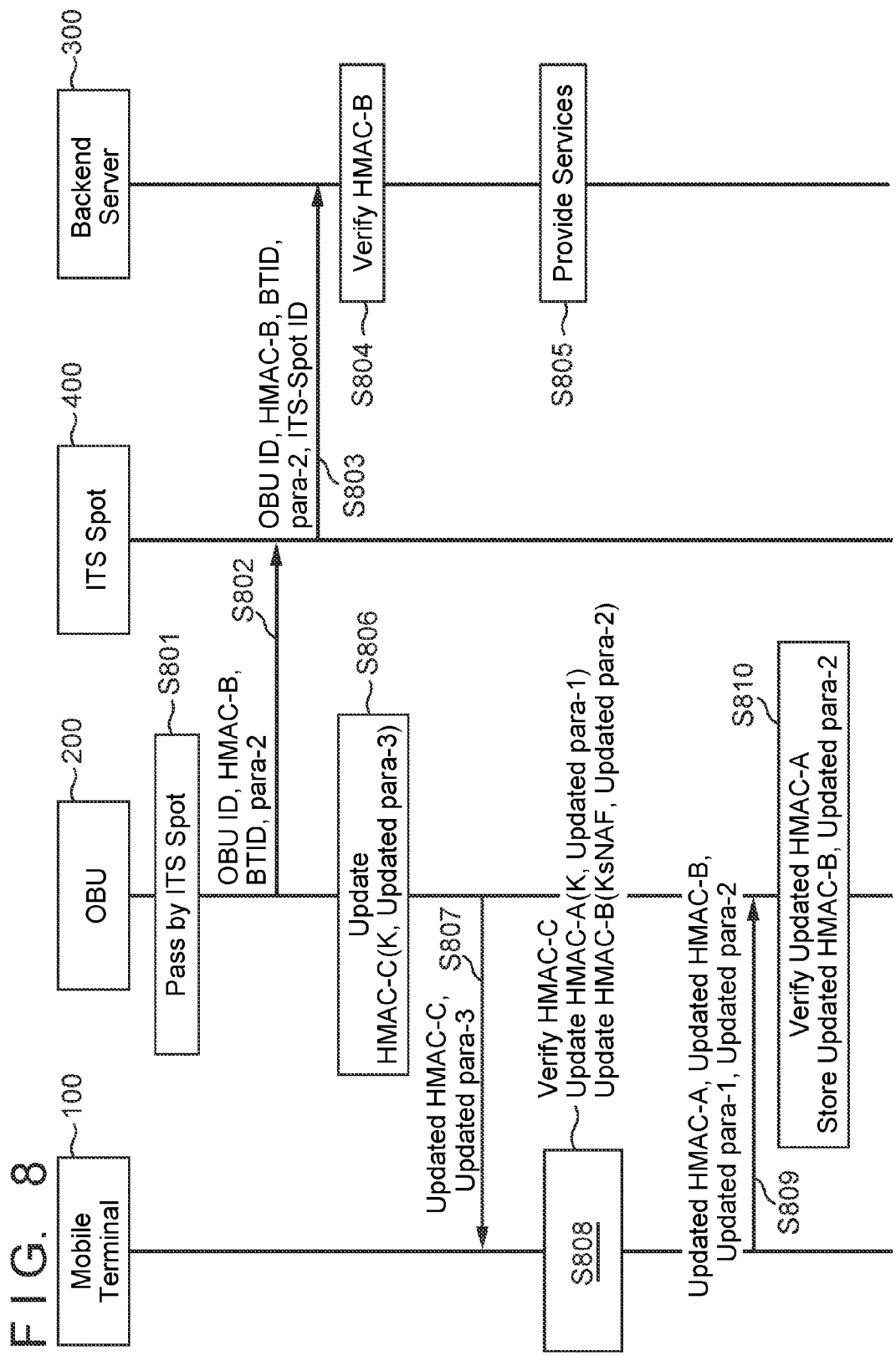
FIG. 8 is a sequence diagram illustrating a procedure of serving the mobile terminal 100 when the OBU 200 passes by the ITS spot 400 according to the second embodiment of the present invention.

FIG. 8 is a sequence diagram illustrating a procedure of serving the mobile terminal 100 when the OBU 200 passes by the ITS spot 400 according to the second embodiment of the present invention.

In step S801, the car loading the OBU 200 passes by the ITS spot 400 (i.e., the OBU 200 enters the communication range of the ITS spot 400).

In step S802, the OBU 200 sends, via the DSRC-based communication, the OBU ID, the HMAC-B, the BTID, and the para-2 to the ITS spot 400. Moreover, the OBU 200 may or may not send the HMAC-A and the para-1 to the ITS spot 400.

In step S803, the ITS spot 400 forwards various information received from the OBU 200 to the backend server 300. Moreover, the ITS spot 400 sends its identity (ITS-Spot ID) to the backend server 300.

In step S804, the backend server 300 verifies the HMAC-B based on the KsNAF, which is identified by the BTID, and the para-2. Moreover, the backend server 300 may or may not verify the HMAC-A.

In step S805, if the HMAC-B (and HMAC-A, optionally) was verified successfully in step S804, the backend server 300 provides the mobile terminal 100 with any pertinent services as described with reference to step S305 of FIG. 3.

In step S806, the OBU 200 updates the HMAC-C by calculating the HMAC based on the key K and the updated third temporary parameter (para-3). For example, if the para-3 is a random number, the OBU 200 uses a random number that is different from the random number used in step S703.

In step S807, the OBU 200 sends the updated HMAC-C and the updated para-3 to request the mobile terminal 100 to update the HMAC-A and the HMAC-B.

In step S808, the mobile terminal 100 updates the HMAC-A as described with reference to step S307 of FIG. 3. Moreover, the mobile terminal 100 updates the HMAC-B by deriving the HMAC based on the KsNAF and the updated second temporary parameter (para-2). For example, if the para-2 is a random number, the mobile terminal 100 uses a random number that is different from the random number used in step S701.

In step S809, if the HMAC-C was verified successfully in step S808, the mobile terminal 100 sends the updated HMAC-A, the updated HMAC-B, the updated para-1, and the updated para-2 to the OBU 200.

In step S810, the OBU 200 verifies the updated HMAC-A based on the key K and the updated para-1. If the updated HMAC-A is verified successfully, the OBU 200 replaces the stored HMAC-B and the para-2 with the updated HMAC-B and the updated para-2. Moreover, if the HMAC-A and the para-1 were stored in step S703, the OBU 200 also replaces the stored HMAC-A and the para-1 with the updated HMAC-A and the updated para-1.

Next, with reference to FIGS. 4-6, functional block diagrams of the mobile terminal 100, the OBU 200, and the backend server 300 according to the second embodiment of the present invention will be described.

With reference to FIG. 4, in addition to the units described in the first embodiment, the mobile terminal 100 comprises a second receiving unit 405, a verifying unit 406, and a revocation requesting unit 407.

The second receiving unit 405 is configured to receive a third temporary parameter and third authentication information derived based on the base shared key and the third temporary parameter. The verifying unit 406 is configured to verify the third authentication information based on the base shared key and the third temporary parameter. The revocation requesting unit 407 is configured to request the backend server to revoke the base shared key if the verification of the third authentication information fails.

With reference to FIG. 5, in addition to the units described in the first embodiment, the OBU 200 comprises a deriving unit 507 and a second sending unit 508.

The deriving unit 507 is configured to derive third authentication information based on the base shared key and the third temporary parameter. The second sending unit 508 is configured to send the third authentication information and the third temporary parameter to the mobile terminal.

With reference to FIG. 6, the functional block diagram of the backend server 300 according to the second embodiment is the same as that of the first embodiment. Of course, as described with reference to FIGS. 7 and 8, the functionality of each unit differs from that of the first embodiment.

As described above, according to the second embodiment, the OBU 200 stores the HMAC-B in place of or in addition to the HMAC-A, and the backend server 300 authenticates the mobile terminal 100 to be served based on the HMAC-B. Because the HMAC-B derives from the KsNAF which the OBU 200 does not have, misuse of the HMAC-B by a malicious OBU can be prevented. Moreover, according to the second embodiment, because the mobile terminal 100 verifies the HMAC-C, the mobile terminal 100 can confirm that the OBU 200 is actually authenticated by the backend server 300. Accordingly, the security is enhanced.

The present invention is not limited to the above-described embodiment, and various changes and modifications can be made within the spirit and scope of the present invention. Therefore, to apprise the public of the scope of the present invention, the following claims are made.

REFERENCES

[1] Japanese Ministry of Land, Infrastructure, Transport and Tourism, "Deployment of 'ITS Spots'" http://www.mlit-.go.jp/road/ITS/topindex/ITSSpot.pdf
[2] U.S. Pat. No. 8,215,546
[3] http://www.3gpp.org/
[4] http://www.orse.or.jp/english/

The invention claimed is:

1. A mobile terminal for use in a system which includes a backend server having a first encryption key and an onboard unit (OBU) capable of verifying a digital signature made by the backend server and decrypting information encrypted with the first encryption key, comprising:
   a memory;
   a transmitter;
   a receiver; and
   a data processing system coupled to the memory, transmitter and receiver, wherein the data processing system is configured to:
   send, to the backend server, an identity of the OBU and identification information of a second encryption key shared between the mobile terminal and the backend server;
   employ the receiver to receive, from the backend server, a base shared key encrypted with the second encryption key, the base shared key encrypted with the first encryption key, and a digital signature made by the backend server for demonstrating authenticity of the base shared key;
   decrypt the base shared key with the second encryption key and derive first authentication information based on the base shared key and a first temporary parameter; and
   send, to the OBU, the base shared key encrypted with the first encryption key, the digital signature, the first authentication information, identification information of the base shared key, and the first temporary parameter.

2. The mobile terminal of claim 1, wherein in response to a request from the OBU:

the mobile terminal updates the first authentication information based on the base shared key and an updated first temporary parameter; and the mobile terminal sends, to the OBU, the updated first authentication information and the updated first temporary parameter.

3. The mobile terminal of claim 1, wherein the data processing system:

derives second authentication information based on the second encryption key and a second temporary parameter;

sends, to the OBU, the second authentication information and the second temporary parameter to the OBU; and sends, to the OBU, the identification information of the second encryption key in place of or in addition to the identification information of the base shared key.

4. The mobile terminal of claim 3, wherein in response to a request from the OBU:

the data processing system updates the second authentication information based on the second encryption key and an updated second temporary parameter; and the data processing system sends, to the OBU, the updated second authentication information and the updated second temporary parameter.

5. The mobile terminal of claim 1, wherein:

the receiver is operable to receive a third temporary parameter and third authentication information derived based on the base shared key and the third temporary parameter;

the data processing system is further configured to verify the third authentication information based on the base shared key and the third temporary parameter; and the data processing system is further configured to request the backend server to revoke the base shared key if the verification of the third authentication information fails.

6. The mobile terminal of claim 1, wherein the data processing system sends, to the OBU, the identification information of the second encryption key as the identification information of the base shared key.

7. An onboard unit (OBU) for use in a system which includes a mobile terminal and a backend server having a first encryption key, comprising:

a receiving unit configured to receive, from the mobile terminal, a base shared key encrypted with a first encryption key, a digital signature made by the backend server for demonstrating authenticity of the base shared key, a first authentication information derived based on the base shared key and a first temporary parameter, identification information of the base shared key, and the first temporary parameter;

a decrypting unit configured to decrypt the base shared key with a decryption key corresponding to the first encryption key;

a verifying unit configured to verify the digital signature and verify the first authentication information based on the base shared key and the first temporary parameter;

a storing unit configured to store the first authentication information, the identification information of the base shared key, and the first temporary parameter if the digital signature and the first authentication information are verified successfully; and a first sending unit configured to send, to a short-range communication station configured to communicate with the backend server, the first authentication information, the identification information of the base shared key, and the first temporary parameter when the OBU enters a communication range of the short-range communication station.

8. The OBU of claim 7, further comprising an update requesting unit configured to request the mobile terminal to update the first authentication information, wherein:

the receiving unit receives an updated first temporary parameter and updated first authentication information derived based on the base shared key and the updated first temporary parameter;

the verifying unit verifies the updated first authentication information based on the base shared key and the updated first temporary parameter; and the storing unit stores the updated first authentication information and the updated first temporary parameter if the updated first authentication information is verified successfully.

9. The OBU of claim 8, wherein:

the receiving unit receives a second temporary parameter and second authentication information derived based on the second temporary parameter and a second encryption key which is shared between the mobile terminal and the backend server;

the receiving unit receives identification information of the second encryption key in place of or in addition to the identification information of the base shared key;

the storing unit stores the second authentication information, the second temporary parameter, and the identification information of the second encryption key in place of or in addition to the first authentication information, the first temporary parameter, and the identification information of the base shared key; and the first sending unit sends, to the short-range communication station, the second authentication information, the second temporary parameter, and the identification information of the second encryption key in place of or in addition to the first authentication information, the first temporary parameter, and the identification information of the base shared key.

10. The OBU of claim 9, wherein:

the update requesting unit requests the mobile terminal to update the second authentication information;

the receiving unit receives an updated second temporary parameter and updated second authentication information derived based on the second encryption key and the updated second temporary parameter; and the storing unit stores the updated second authentication information and the updated second temporary parameter if the updated first authentication information is verified successfully.

11. The OBU of claim 7, further comprising:

a deriving unit configured to derive third authentication information based on the base shared key and a third temporary parameter; and a second sending unit configured to send the third authentication information and the third temporary parameter to the mobile terminal.

12. The OBU of claim 7, wherein the receiving unit receives, from the mobile terminal, identification information of the second encryption key as the identification information of the base shared key.

13. A backend server for use in a system which includes a mobile terminal and an onboard unit (OBU) capable of verifying a digital signature made by the backend server and decrypting information encrypted with a first encryption key, comprising:

a first receiving unit configured to receive, from the mobile terminal, an identity of the OBU and identification information of a second encryption key shared between the mobile terminal and the backend server;

a generating unit configured to generate a base shared key encrypted with the second encryption key, the base shared key encrypted with the first shred key corresponding to the identity of the OBU, and a digital signature for demonstrating authenticity of the base shared key;

a sending unit configured to send, to the mobile terminal, the base shared key encrypted with the second encryption key, the first shred key encrypted with the first shred key, and the digital signature;

a second receiving unit configured to receive, from a short-range communication station, a first temporary parameter, first authentication information derived based on the base shared key and the first temporary parameter, and identification information of the base shared key; and a verifying unit configured to verify the first authentication information based on the first temporary parameter and the base shared key.

14. The backend server of claim 13, wherein the second receiving unit receives, from the short-range communication terminal, a second temporary parameter, second authentication information derived based on the second encryption key and the second temporary parameter, and identification information of the second encryption key in place of or in addition to the first temporary parameter, the first authentication information, and the identification information of the base shared key; and the verifying unit verifies the second authentication information, in place of or in addition to the first authentication information, based on the second temporary parameter and the second encryption key.

15. The backend server according of claim 13, wherein the second receiving unit receives identification information of the second encryption key as the identification information of the base shared key.

16. A method for controlling a mobile terminal for use in a system which includes a backend server having a first encryption key and an onboard unit (OBU) capable of verifying a digital signature made by the backend server and decrypting information encrypted with the first encryption key, comprising:

a first sending step of sending, to the backend server, an identity of the OBU and identification information of a second encryption key shared between the mobile terminal and the backend server;

a first receiving step of receiving, from the backend server, a base shared key encrypted with the second encryption key, the base shared key encrypted with the first encryption key, and a digital signature made by the backend server for demonstrating authenticity of the base shared key;

a deriving step of decrypting the base shared key with the second encryption key and deriving first authentication information based on the base shared key and a first temporary parameter; and a second sending step of sending, to the OBU, the base shared key encrypted with the first encryption key, the digital signature, the first authentication information, identification information of the base shared key, and the first temporary parameter.

17. A method for controlling an onboard unit (OBU) for use in a system which includes a mobile terminal and a backend server having a first encryption key, comprising:

a receiving step of receiving, from the mobile terminal, a base shared key encrypted with a first encryption key, a digital signature made by the backend server for demonstrating authenticity of the base shared key, a first authentication information derived based on the base shared key and a first temporary parameter, identification information of the base shared key, and the first temporary parameter;

a decrypting step of decrypting the base shared key with a decryption key corresponding to the first encryption key;

a verifying step of verifying the digital signature and verifying the first authentication information based on the base shared key and the first temporary parameter;

a storing step of storing the first authentication information, the identification information of the base shared key, and the first temporary parameter if the digital signature and the first authentication information are verified successfully; and a first sending step of sending, to a short-range communication station configured to communicate with the backend server, the first authentication information, the identification information of the base shared key, and the first temporary parameter when the OBU enters a communication range of the short-range communication station.

18. A method for controlling a backend server for use in a system which includes a mobile terminal and an onboard unit (OBU) capable of verifying a digital signature made by the backend server and decrypting information encrypted with a first encryption key, comprising:

a first receiving step of receiving, from the mobile terminal, an identity of the OBU and identification information of a second encryption key shared between the mobile terminal and the backend server;

a generating step of generating a base shared key encrypted with the second encryption key, the base shared key encrypted with the first shred key corresponding to the identity of the OBU, and a digital signature for demonstrating authenticity of the base shared key;

a sending step of sending, to the mobile terminal, the base shared key encrypted with the second encryption key, the first shred key encrypted with the first shred key, and the digital signature;

a second receiving step of receiving, from a short-range communication station, a first temporary parameter, first authentication information derived based on the base shared key and the first temporary parameter, and identification information of the base shared key; and a verifying step of verifying the first authentication information based on the first temporary parameter and the base shared key.

* * * * *